United States Patent Office 3,457,104
Patented July 22, 1969

3,457,104
METHOD FOR BONDING A POLYESTER RESIN TO A RESINOUS SUBSTRATE
Alexander Christian Bristol, Stamford, Conn., assignor to American Cyanamid Company, Stamford, Conn., a corporation of Maine
No Drawing. Filed Mar. 7, 1966, Ser. No. 532,099
Int. Cl. B44d 1/24; B32b 27/36; C09d 3/48
U.S. Cl. 117—138.8
10 Claims

ABSTRACT OF THE DISCLOSURE

A method for the production of a resin body having a mar-resistant surface which comprises coating the body with a substantially linear, water-insoluble, non-gelled, unsaturated polyester resin containing isopropyl percarbonate and curing the polyester resin at a low temperature to a hard, thermoset state, is disclosed.

---

The production of resins in sheet form is a rapidly growing business in the plastics industry. These sheets generally have excellent structural properties and find use in many applications wherein other materials fail. One general disadvantage of these polymer sheets, however, is that their resistance to wear, mar and chemicals is not satisfactory for all purposes.

It has been shown that one may coat a resin sheet with a polyester material which is capable of being cross-linked to a thermoset condition and thereby produce a mar-resistant surface on the resin. However, many commercially available resins contain various additive ingredients which tend to exude or gas out of the resin when it is heated thereby resulting in products having poor optical and adhesive characteristics.

I have now found that by utilizing isopropyl percarbonate as the curing catalyst for the polyester mar-resistant surface, I can prevent the additive or volatile ingredients from exuding or gasing out of the resin sheet. In this manner, I produce an article of manufacture having improved optics, superior mar-resistance, superior chemical resistance and excellent impact strength.

It is therefore an object of the present invention to produce a resin body having a mar-resistant surface bonded thereto.

A further object of the present invention is to provide a process for the production of a mar-resistant, chemical-resistant resin article by coating the resin with a mar-resistant polyester composition containing isopropyl percarbonate and curing the polyester at low temperature to a hard, thermoset condition.

These and other objects of the present invention will become more apparent to one skilled in the art upon reading the more detailed description set forth hereinbelow.

Any known unsaturated polyester resin may be used as the surface coating in my novel process, i.e., those polyester resins produced by reacting an unsaturated polycarboxylic acid with a saturated or unsaturated polyhydric alcohol under conditions well known to those skilled in the art.

A preferred coating for use as the mar-resistant surface on the resin in the practice of the present invention however, is broadly, a substantially linear, water-insoluble, non-gelled unsaturated polyester resin composition comprising a blend of (1) the esterification reaction product of reactants consisting essentially of fumaric acid and a polyethylene or polypropylene glycol wherein said glycol has between 6 and 39 carbon atoms, and said product has an acid number below about 35 and (2) a glycol diacrylate which is the reaction product of a glycol selected from the group consisting of polyglycols having from 4 to 8 carbon atoms and monoglycols containing from 2 to 4 carbon atoms, inclusive, and an acid selected from the group consisting of acrylic acid and methacrylic acid, wherein (2) is present in an amount varying between about 10% and 40%, by weight, based on the total weight of (1) and (2).

In order to eliminate any tendency for said coating to develop a haze, especially over a wide temperature range, these aforementioned linear, polyester resin compositions may be further modified by adding thereto about 1% and 5%, by weight, of a polymerizable styrene, said percentages by weight being based on the total weight of the glycol fumarate, the glycol diacrylate and the styrene monomer. A more specific disclosure of such compositions is set forth in copending application, Ser. No. 390,-197, filed Aug. 17, 1964, now U.S. Patent No. 3,265,763 in the names of Deichert and Christensen.

More specifically, the surfacing materials which are preferably used to impart the mar-resistant characteristic to the plastic base in the process of the present invention are more completely set forth in at least one of copending applications Ser. No. 307,812, filed Sept. 10, 1963, now U.S. Patent No. 3,266,372, in the names of Deichert and Webb, and Ser. No. 474,142 filed July 22, 1965, in the names of De Lapp and Deichert. In the aforesaid applications, there are set forth disclosures of substantially linear, water-insoluble, non-gelled unsaturated polyester resin compositions which may be used as the surfacing components in the present invention. These earlier polyester resin compositions impart to the substrates to which they are applied, markedly improved mar-resistant properties in those instances when the substrate has a defficiency in mar-resistance. When the plastic substrate is coated with the polyester resin composition used in the present invention without using a low temperature cure and isopropyl percarbonate, the bonding of the polyester resin film to the substrate is poorer, as measured by the Scotch tape grid test, than a comparable plastic base which has been coated according to the instant process.

Generally, these substantially linear, water-insoluble, non-gelled, unsaturated polyester resin compositions comprise a blend of two principal components, namely certain fumaric acid/glycol polyester resins and certain glycol diacrylates.

The fumaric acid/glycol polyester component is, as mentioned above, the esterification reaction product produced by reacting components consisting essentially of fumaric acid and a polyethylene or polypropylene glycol. Among the polyethylene glycols which may be used to esterify the fumaric acid are triethylene glycol, tetraethylene glycol, pentaethylene glycol, hexaethylene glycol, heptaethylene glycol, octaethylene glycol, dodecaethylene glycol, tridecaethylene glycol and the like.

Among the polypropylene glycols which may be used to esterify the fumaric acid are dipropylene glycol, tripropylene glycol, tetrapropylene glycol, pentapropylene glycol, hexapropylene glycol, heptapropylene glycol, octapropylene glycol, nonapropylene glycol, decapropylene glycol, undecapropylene glycol, dodecapropylene glycol, tridecapropylene glycol and the like.

The preferred polypropylene glycols, preferred in that they impart a higher degree of weatherability to the resultant compositions than the other polypropylene glycols, are the secondary isomers of the above specified polypropylene glycols. These secondary isomers possess at least one terminal hydroxyl group on a secondary carbon atom.

Examples of isomeric compounds I may use in the practice of my invention include the secondary isomer of dipropylene glycol and the (secondary, secondary)

isomer of dipropylene glycol. Similarly, the secondary and (secondary, secondary) isomers of all of the above specified polypropylene glycols may be used herein.

The polyethylene glycols and the polypropylene glycols may be used singly or as mixtures with themselves or one another and still be within the scope of the present invention.

In the preparation of these polyester resin compositions, the fumaric acid and the polyethylene or polypropylene glycol may be used in substantially equimolar proportions, since each is, for the purposes of esterification, difunctional. For preferred processing results, however, an excess, amounting to about 5 to 20% of the polyethylene or polypropylene glycol should be used over and beyond that amount stoichiometrically calculated to esterify substantially all of the carboxyl groups in the fumaric acid.

The secondary component used in the above-mentioned surfacing compositions, namely the glycol diacrylate, is prepared by esterifying the acrylic acid or methacrylic acid with a polyglycol or monoglycol. Among the polyglycols which may be used to produce the glycol diacrylates are diethylene glycol, triethylene glycol, tetraethylene glycol, dipropylene glycol, bis(4-hydroxybutyl ether) and the like. Among the monoglycols which may be used to esterify the acrylic acids are ethylene glycol, propylene glycol, the propanediols-1,2 and 1,3; the butanediols-1,2; 1,3; and 1,4 and the like. These glycol diacrylates can be used with the glycol fumarates either singly or in combination with one another. However, whether used singly or in combination, the glycol diacrylate should be present in the total composition in the amounts specified above.

An additional mar-resistant coating which may be utilized in my novel process includes those composed of (A) the esterification reaction product of triethylene glycol and fumaric acid, (B) ethyl acrylate, (C) allyl methacrylate and (D) triallyl cyanurate, This composition is the subject of copending application, Ser. No. 454,714, filed May 10, 1965, now U.S. Patent No. 3,294,867 in the names of Bristol, Sherr, and Deichert, and contains between 60%, by weight, and 90% by weight, based on the total composition, of component (A) and from about 40%, by weight, to about 10%, by weight, of the other different copolymerizable monomers (B), (C) and (D). Trace amounts, i.e., up to 5%, of other acids such as phthalic acid, adipic acid, succinic acid, etc. and/or other alcohols such as 2-ethyl-1,3-hexanediol, neopentyl glycol, etc. may also be tolerated.

A further example of a suitable mar-resistant coating useful herein is set forth in copending application, Ser. No. 459,464, filed May 27, 1965, now U.S. Patent No. 3,318,975, in the names of Deichert and Bristol. This composition is composed of (a) the esterification reaction product of triethylene glycol and fumaric acid, (b) allyl methacrylate and (c) certain glycol diacrylates, i.e., those disclosed more fully hereinabove. The same trace amounts of acids and alcohols as specified immediately above may also be tolerated in this composition.

In a further modification, a suitable mar-resistant coating which may be used herein is composed of (I) the esterification reaction product of fumaric acid, triethylene glycol and 2-ethyl-1,3-hexanediol, (II) a polymerizable styrene and (III) certain glycol diacrylates. Component (III) is more fully discussed hereinabove in regard to other useful mar-resistant coatings. Examples of polymerizable styrenes, useful in this composition and also that mentioned hereinabove in regard to the prevention of haziness, include styrene per se, side chain and ring-substituted halo and/or alkyl styrenes such as α-chlorostyrene, α-methylstyrene, o-, m-, and p-methyl styrenes, o-, m-, and p-chlorostyrenes, 2,4-dimethyl styrene, 2,5-dimethylstyrene, 2,3-dichlorostyrene, 2,4-dibromostyrene and the like. The use of the substituted styrenes is to be avoided, however, when a clear, water-white composition is desired. This composition is more fully set forth in copending application, Ser. No. 398,053, filed Sept. 21, 1964, now U.S. Patent No. 3,265,764 in the names of Deichert, Christensen and Ramsey, which application and all those mentioned hereinabove are hereby incorporated herein by reference.

Any known resin which contains a material which tends to exude or gas out of the resin when it is heated to any substantial degree, i.e., about 50° C., may be used as the substrate in the process of the instant invention. One useful class of resins is the polycarbonates, i.e., those materials produced by reacting phosgene with a dihydric phenol such as bisphenol-A; alkyl, halo, carboxyl or hydroxy derivatives of bisphenol-A or bisphenol-A condensates under known reaction conditions. For example, the bisphenol-A component is melted and the phosgene is injected into the melt under pressure. These bisphenol-A polycarbonates generally have the formula (I) 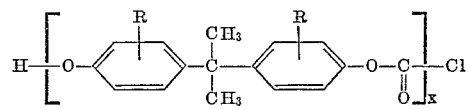

wherein R is H, an alkyl, halo, carboxyl or hydroxy radical and $x$ is a number of recurring units in the polymer. More specific details regarding useful polycarbonates and their production can be found in Christopher et al., Polycarbonates, Reinhold Publishing Corp., New York, 1962, which publication is hereby incorporated herein by reference.

Other resins which may be coated according to my novel process include polyvinyl chloride, cellulose acetate, cellulose acetate butyrate and the like.

Resin substrates which already possess a coating such as polyvinyl butyral etc., to increase the bonding strength of the mar-resistant coating, may also be treated according to my novel process.

As mentioned above, I must utilize isopropyl percarbonate as the catalyst in order to cure the thermosetting polyester resin coating to the gelled state at low temperature. The isopropyl percarbonate may be used alone in concentrations ranging from about 0.25% to about 10.0% preferably from about 2.0% to about 4.0% or in combination with other well-known polymerization initiators. When the isopropyl percarbonate is utilized alone, the coating is rapidly formed into a gelled state by heating it at relatively low temperatures, e.g., from about 0° C.–70° C., preferably 20° C.–50° C., and thereby prevents any additives in the resin substrate from being released. In the preferred embodiment, that is when the isopropyl percarbonate is utilized in combination with other polymerization initiators, the coating goes through a rapid transition from the uncured, ungelled state to the gelled, thermosetting state to the thermoset state to thereby produce the ultimate resistant product. The substantially linear, water-soluble, non-gelled, unsaturated polyester resin composition, once coated on the substrate resin, may be converted to the thermoset state in the presence of the catalyst with or without the application of heat or pressure. The catalytic materials which may be used in combination with the isopropyl percarbonate to make this final thermoset conversion in the state of the polyester are well known in the art and have been used extensively for this purpose.

Illustrative supplementary catalysts are the peroxide catalysts such as, benzoyl peroxide, tertiary butyl hydroperoxide, ditertiary butyl peroxide, and cumene hydroperoxide, among many others. The ketone peroxides may also be used, i.e., the methyl ethyl ketone peroxide, the diethyl ketone peroxide and the like. The amounts of the catalytic material used will be conventional, such as between about 0.01% and 10% and more, usually between about 0.1% and 3%, by weight, based on the total weight of the polymerizable composition.

The coated plastic articles produced according to the process of the present invention have a plurality of designed end uses such as transparent panels to be used as windowpanes, television implosion shields, optical lenses such as those used in eyeglasses, including sunglasses, binoculars, telescopes and the like. If desired, the polyester resin compositions coated on the polymer substrate may have incorporated therein, ultraviolet light absorbers of which a substantial plurality are well known in the art. A significant number of these ultraviolet absorbers are disclosed in the Day et al. U.S. Patent 2,777,828. The amounts used are now conventional and are set forth in the aforementioned reference. If desired, particularly for show-window purposes and sunglasses, photochromic materials may also be incorporated into the polyester which is coated on the substrates, thereby permitting changes from a colored object to a clear object and vice versa, due to the absence or presence of light, including sunlight. If a permanent coloration is desired certain dyes and/or pigments may be dissolved in the unsaturated polymerizable polyester resin in order to achieve a tinting before coating on the polymer base.

The following examples are set forth for purposes of illustration only and are not to be construed as limitations on the present invention except as set forth in the appended claims. All parts and percentages are by weight unless otherwise indicated.

EXAMPLE 1

A sheet of a commercially available polycarbonate resin is cleaned with isopropyl alcohol and dried for 15 minutes at 70° C. Thereafter, a polyester resin composition comprising 75 parts of a triethylene glycol; fumaric acid; 2-ethyl-1,2-hexanediol (45/45/10) polyester and 19.2 parts of polyethylene glycol dimethacrylate, catalyzed with a mixture of 3.85 parts of isopropyl percarbonate and 1.95 parts of benzoyl peroxide, is poured onto the bottom plate of a glass casting cell. The polycarbonate sheet is then placed on top of the liquid polyester, avoiding air entrapment. More of the same polyester is then poured onto the polycarbonate sheet and the top glass plate is then placed atop the second polyester layer. The entire assembly is then clamped together and held at 50° C. for 1 hour and then at 75° C. for 1 hour. Upon cooling, the glass plates are removed and the surface of the resultant sheet is tested for mar-resistance and bond strength. The mar-resistance is evaluated as 3 using a mar-tester, the bond is excellent as measured by the Scotch tape grid test, and the article is optically clear. The mar-resistance of an uncoated sheet of polycarbonate using the same mar-tester is 30. A rating of 1–5 is considered very good while a rating of over 16 is poor. When the same procedure is conducted except that no isopropyl percarbonate is used, no bonding occurs because additives in the polycarbonate exude and gas out at 65° C.

The Scotch tape grid test is accomplished by scratching the finished surface through, with a sharp point in a series of parallel lines about 1/16" apart and then with a similar series at right angles to the first series also spaced 1/16" apart. A piece of No. 600 Scotch brand cellophane tape is firmly pressed into contact with the coated surface so as to cover the scratched lines. When the tape is pulled off quickly, no peeling of the coated surface will be observed if the bonding is excellent. Slight removal of the finish at the edges of the scratches is permissible without effecting the bonding.

EXAMPLE 2

Example 1 is repeated in substantially all details except that the mar-resistance polyester resin composition which is coated on the polycarbonate sheet contains, additionally, about 3 parts of styrene. The mar-resistance of the resultant coated article is 3, the bonding is excellent, as measured by the Scotch tape grid test, and the product is optically clear. When the isopropyl percarbonate is omitted, no bonding is achieved.

Following the procedure of Example 1, various other polyester compositions and base polymers, were utilized according to the instant invention. The results are set forth in the table, hereinbelow.

TABLE

| Ex. | Polyester composition, parts | Base polymer | Isopropyl percarbonate, parts | Secondary catalyst, parts | Cure cycle | Mar resistance | Optical clarity | Grid test |
|---|---|---|---|---|---|---|---|---|
| 3 | Sec., sec. isomer of dipropylene glycol fumarate, 80; diethyleneglycol diacrylate, 20; styrene, 10. | Polyvinyl chloride. | 3.5 | None | R.T. 8 hours | 4 | Good | Passed. |
| 4 | Triethylene glycol fumarate, 296; ethyl acrylate, 60; allyl methacrylate, 24; triallyl cyanate, 20. | Cellulose acetate butyrate. | 4.0 | Di-t-butyl peroxide, 1.8. | 45° C., 1 hour; 130° C., 1 hour. | 2 | Fair | Do. |
| 5 | Diethyleneglycol fumarate (1/1), 80; ethyleneglycol dimethacrylate, 20. | Cellulose acetate | 2.5 | Cumene hydroperoxide, 1.0. | 50° C., 1 hour; 100° C., 1 hour. | 3 | do | Do. |
| 6 | Tetrapropylene-glycol fumarate (1/1), 80; triethyleneglycol dimethacrylate, 10; allylmethacrylate, 10. | Poly(carbonate)[1] | 3.0 | None | 35° C., 4 hours | 4 | Very good | Do. |

[1] Reaction product of bisphenol-A and phosgene.

I claim:

1. A process for improving the mar-resistance of a resin sheet which tends to exude and gas out materials upon heating which comprises coating such a sheet with an unsaturated polyester composition containing a catalytic amount of isopropyl percarbonate and curing the polyester at a temperature below which said resin sheet begins to exude and gas out materials.

2. A process according to claim 1 wherein said unsaturated polyester resin is a substantially linear, water-insoluble, ungelled, unsaturated polyester resin.

3. A process according to claim 1 wherein said polyester resin is composed of (1) the esterification reaction product of fumaric acid and a glycol selected from the group consisting of a polyethylene glycol and a polypropylene glycol wherein said glycol has between 6 and 39 carbon atoms, said reaction product having an acid number below about 35 and (2) at least one copolymerizable monomer.

4. A process according to claim 3 wherein said copolymerizable monomer is a glycol diacrylate which is the reaction product of a glycol selected from the group consisting of polyglycols having from 4 to 8 carbon atoms, inclusive, and monoglycols having from 2 to 4 carbon atoms, inclusive, and an acid selected from the group consisting of acrylic acid and methacrylic acid wherein (2) is present in an amount ranging from about 10% and 40%, by weight, based on the total weight of (1) and (2).

5. A process according to claim 3 wherein said polyester resin also contains (3) a polymerizable styrene, in an amount varying between about 1% and 5%, by weight, based on the total weight of (1), (2), and (3).

6. A process according to claim 1 wherein said polyester resin comprises a blend of (1) the esterification reaction product of fumaric acid and triethylene glycol, said product having an acid number below about 35 and (2) ethylene glycol dimethacrylate, wherein (2) is present in an amount varying between about 10% and 40%, by weight, based on the total weight of (1) and (2).

7. The product produced by the process of claim 1.
8. The product produced by the process of claim 2.
9. The product produced by the process of claim 3.
10. The product produced by the process of claim 4.

References Cited
UNITED STATES PATENTS

| | | | |
|---|---|---|---|
| 3,318,975 | 5/1967 | Deichert et al. | 260—861 X |
| 2,320,533 | 6/1943 | Muskat et al. | 117—138.8 X |
| 2,322,310 | 6/1943 | Muskat et al. | 117—138.8 X |
| 2,360,650 | 10/1944 | Crane | 117—138.8 X |
| 2,370,588 | 2/1945 | Strain. | |
| 2,372,982 | 4/1945 | Richards et al. | 117—138.8 X |
| 3,022,281 | 2/1962 | Smith. | |
| 3,108,093 | 10/1963 | Pajaczkowski et al. | |
| 3,264,372 | 8/1966 | Deichert et al. | 260—861 X |
| 3,265,763 | 8/1966 | Deichert et al. | 260—861 X |
| 3,265,764 | 8/1966 | Deichert et al | 260—861 X |

FOREIGN PATENTS 540,940  11/1941  Great Britain.

WILLIAM D. MARTIN, Primary Examiner

J. E. MILLER, Assistant Examiner

U.S. Cl. X.R.

117—161; 161—183, 231, 256